US012571079B2

(12) United States Patent
Tsutsumiuchi et al.

(10) Patent No.: US 12,571,079 B2
(45) Date of Patent: Mar. 10, 2026

(54) CUBIC BORON NITRIDE SINTERED MATERIAL AND TOOL

(71) Applicants: SUMITOMO ELECTRIC HARDMETAL CORP., Hyogo (JP); SUMITOMO ELECTRIC INDUSTRIES, LTD., Osaka (JP)

(72) Inventors: Yuki Tsutsumiuchi, Hyogo (JP); Yusuke Matsuda, Hyogo (JP); Yuh Ishida, Hyogo (JP); Yuka Deguchi, Osaka (JP); Machiko Abe, Hyogo (JP); Satoru Kukino, Hyogo (JP); Akito Ishii, Osaka (JP); Katsumi Okamura, Osaka (JP)

(73) Assignees: SUMITOMO ELECTRIC HARDMETAL CORP., Hyogo (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 18/878,748

(22) PCT Filed: Apr. 26, 2024

(86) PCT No.: PCT/JP2024/016539
§ 371 (c)(1),
(2) Date: Dec. 24, 2024

(87) PCT Pub. No.: WO2024/225465
PCT Pub. Date: Oct. 31, 2024

(65) Prior Publication Data
US 2025/0163548 A1    May 22, 2025

(30) Foreign Application Priority Data
Apr. 27, 2023    (JP) ................................. 2023-073631

(51) Int. Cl.
*C22C 26/00*       (2006.01)
*B23B 27/14*       (2006.01)
*C22C 1/051*       (2023.01)
*B22F 5/00*        (2006.01)

(52) U.S. Cl.
CPC ............. *C22C 26/00* (2013.01); *C22C 1/051* (2013.01); *B22F 2005/001* (2013.01); *B23B 27/148* (2013.01); *B23B 2200/283* (2013.01); *B23B 2200/286* (2013.01); *B23B 2222/04* (2013.01); *B23B 2222/28* (2013.01); *B23B 2222/88* (2013.01); *B23B 2222/92* (2013.01); *B23B 2226/125* (2013.01); *C22C 2026/006* (2013.01)

(58) Field of Classification Search
CPC .............................. C22C 26/00; B23B 27/148
See application file for complete search history.

(56) References Cited

U.S. PATENT DOCUMENTS

| | | | | |
|---|---|---|---|---|
| 3,745,623 A | * | 7/1973 | Wentorf, Jr. ............. | B24D 3/06 51/307 |
| 5,015,265 A | * | 5/1991 | Corrigan ............. | C04B 35/5831 51/293 |
| 8,148,282 B2 | * | 4/2012 | Kountanya ............. | B01J 3/065 407/119 |
| 2005/0210755 A1 | * | 9/2005 | Cho ........................ | B23P 15/28 51/293 |
| 2017/0121230 A1 | | 5/2017 | Zhang et al. | |
| 2023/0211422 A1 | | 7/2023 | Watanabe et al. | |

FOREIGN PATENT DOCUMENTS

| | | | |
|---|---|---|---|
| JP | 2011-189421 | A | 9/2011 |
| JP | 2019-172477 | A | 10/2019 |
| JP | 2020-28929 | A | 2/2020 |
| JP | 2020-131293 | A | 8/2020 |
| JP | 7112607 | B2 | 8/2022 |

\* cited by examiner

*Primary Examiner* — Alexandra M Moore
(74) *Attorney, Agent, or Firm* — Renner, Otto, Boisselle & Sklar, LLP

(57)        ABSTRACT cBN sintered material, including cBN particles; a binder phase; and a first phase,
  wherein the content of the cBN particles in the cBN sintered material is 25% to 80% by volume,
  the binder phase contains either or both of
    one or more first compounds, and
    a solid solution derived from the first compound,
  the first phase contains cobalt, tungsten, and at least one first element selected from the group consisting of the elements contained in the binder phase,
  the total content of cobalt and tungsten in the cBN sintered material is 1.0% to 6.0% by mass,
  the binder phase consists of multiple binder phase particles containing 50% or more of first binder phase particles on a number basis,
surfaces of the first binder phase particles include 50% by area or more of a first region which is in contact with the first phase.

9 Claims, No Drawings

CUBIC BORON NITRIDE SINTERED MATERIAL AND TOOL

TECHNICAL FIELD

The present disclosure relates to cubic boron nitride sintered material and a tool. The present application claims priority to Japanese Patent Application No. 2023-073631, which is a Japanese patent application filed on Apr. 27, 2023. The contents described in the Japanese patent application are incorporated herein by reference in their entirety.

BACKGROUND ART

Since cubic boron nitride (hereinafter also described as "cBN") sintered material has very high hardness, and is also high in heat stability and chemical stability, cubic boron nitride sintered material has been used for cutting tools and wear-resistant tools. Cubic boron nitride sintered material has been examined, for example, for the content of cBN particles and the type of the binder phase to obtain characteristics suitable for the use.

PTL 1 discloses a technique involving spreading a W-Co phase between cubic boron nitride particles in cubic boron nitride sintered material containing the cubic boron nitride particles and Ti compound particles as a binder phase to improve the crater abrasion resistance and the chipping resistance.

CITATION LIST

Patent Literature

PTL 1: Japanese Patent Laying-Open No. 2020-28929

SUMMARY OF INVENTION

Cubic boron nitride sintered material of the present disclosure is cubic boron nitride sintered material, comprising cubic boron nitride particles; a binder phase; and a first phase, wherein the content of the cubic boron nitride particles in the cubic boron nitride sintered material is 25% by volume or more and 80% by volume or less, the binder phase contains either or both of one or more first compounds consisting of at least one element selected from the group consisting of titanium, zirconium, hafnium, vanadium, niobium, tantalum, chromium, molybdenum, aluminum, and silicon, and at least one element selected from the group consisting of nitrogen, carbon, boron, and oxygen, and a solid solution derived from the first compound, the first phase contains cobalt, tungsten, and at least one first element selected from the group consisting of the elements contained in the binder phase, the total content of cobalt and tungsten in the cubic boron nitride sintered material is 1.0% by mass or more and 6.0% by mass or less, the binder phase consists of multiple binder phase particles, the multiple binder phase particles contain 50% or more of first binder phase particles on a number basis, surfaces of the first binder phase particles include 50% by area or more of a first region, and the first region is in contact with the first phase.

DETAILED DESCRIPTION

Problem to be Solved by the Present Disclosure

Need for high-efficiency machining of high-hardness steel is growing these days. Cubic boron nitride sintered material has therefore been desired that enables providing a tool having a long tool life even in high efficiency machining of high-hardness steel in the case where the cubic boron nitride sintered material is used as a tool material.

Thereupon, an object of the present disclosure is to provide cubic boron nitride sintered material that enables providing a tool having a long tool life even in high-efficiency machining of high-hardness steel in the case where the cubic boron nitride sintered material is used as a tool material, and a tool containing the cubic boron nitride sintered material.

Advantageous Effect of the Present Disclosure

The present disclosure enables providing cubic boron nitride sintered material that enables providing a tool having a long tool life even in high-efficiency machining of high-hardness steel in the case where the cubic boron nitride sintered material is used as a tool material, and a tool containing the cubic boron nitride sintered material.

DESCRIPTION OF EMBODIMENTS

Embodiments of the present disclosure are first exemplified for description.

(1) Cubic boron nitride sintered material of the present disclosure is cubic boron nitride sintered material, comprising cubic boron nitride particles; a binder phase; and a first phase, wherein the content of the cubic boron nitride particles in the cubic boron nitride sintered material is 25% by volume or more and 80% by volume or less, the binder phase contains either or both of one or more first compounds consisting of at least one element selected from the group consisting of titanium, zirconium, hafnium, vanadium, niobium, tantalum, chromium, molybdenum, aluminum, and silicon, and at least one element selected from the group consisting of nitrogen, carbon, boron, and oxygen, and a solid solution derived from the first compound, the first phase contains cobalt, tungsten, and at least one first element selected from the group consisting of the elements contained in the binder phase, the total content of cobalt and tungsten in the cubic boron nitride sintered material is 1.0% by mass or more and 6.0% by mass or less, the binder phase consists of multiple binder phase particles, the multiple binder phase particles contain 50% or more of first binder phase particles on a number basis, surfaces of the first binder phase particles include 50% by area or more of a first region, and the first region is in contact with the first phase.

The present disclosure enables providing cubic boron nitride sintered material that enables providing a tool having a long tool life even in high-efficiency machining of high-hardness steel in the case where the cubic boron nitride sintered material is used as a tool material, and a tool containing the cubic boron nitride sintered material.

(2) In the above-mentioned (1), the multiple binder phase particles may contain 50% or more of second binder phase particles on a number basis, and surfaces of the second binder phase particles may include 75% by area or more of the first region.

This further improves the life of a tool comprising the cubic boron nitride sintered material.

(3) In the above-mentioned (1) or (2), the binder phase may contain at least one element selected from the group consisting of titanium, chromium, aluminum, carbon, nitrogen, and boron. This further improves the life of a tool comprising the cubic boron nitride sintered material.

(4) In any of the above-mentioned (1) to (3), the first element may contain at least one element selected from the group consisting of aluminum, carbon, nitrogen, boron, and silicon. This further improves the life of a tool comprising the cubic boron nitride sintered material.

(5) In any of the above-mentioned (1) to (4), the first phase may be absent on an interface between the cubic boron nitride particles and the binder phase. This further improves the life of a tool comprising the cubic boron nitride sintered material in intermittent machining under particularly severe conditions.

(6) In any of the above-mentioned (1) to (5), the first phase may have a thickness of 20 nm or less. This further improves the life of a tool comprising the cubic boron nitride sintered material in intermittent machining under particularly severe conditions.

(7) In any of the above-mentioned (1) to (6), the tungsten content in the first phase may be higher than the cobalt content in the first phase. This further improves the life of a tool comprising the cubic boron nitride sintered material in intermittent machining under particularly severe conditions.

(8) A tool of the present disclosure contains cubic boron nitride sintered material of any of the above-mentioned (1) to (7). The tool of the present disclosure can have a long tool life even in high-efficiency machining of high-hardness steel.

Detail of Embodiments of the Present Disclosure

Hereinafter, specific examples of the cubic boron nitride sintered material and the tool of the present disclosure will be described. An expression in the form of "A to B" herein means the upper and lower limits of the range (namely A or more and B or less). If no unit is attached to A, and a unit is attached to only B, the unit of A is the same as the unit of B.

If a compound is represented by a chemical formula herein, the atomic ratio that is not particularly limited shall include all the conventionally known atomic ratios, and should not be necessarily limited exclusively to the stoichiometric range.

If one or more numerical values are described as each of the lower limit and the upper limit in the present disclosure, a combination of any one numerical value described as the lower value and any one numerical value described as the upper value shall also be disclosed. For example, if a1 or more, b1 or more, and c1 or more are described as the lower limit, and a2 or less, b2 or less, and c2 or less are described as the upper limit, the description shall disclose a1 or more and a2 or less, a1 or more and b2 or less, a1 or more and c2 or less, b1 or more and a2 or less, b1 or more and b2 or less, b1 or more and c2 or less, c1 or more and a2 or less, c1 or more and b2 or less, and c1 or more and c2 or less.

Embodiment 1: Cubic Boron Nitride Sintered Material

Cubic boron nitride sintered material according to an embodiment of the present disclosure (hereinafter also described as "Embodiment 1") is cubic boron nitride sintered material, comprising cubic boron nitride particles; a binder phase; and a first phase, wherein the content of the cubic boron nitride particles in the cubic boron nitride sintered material is 25% by volume or more and 80% by volume or less, the binder phase contains either or both of one or more first compounds consisting of at least one element selected from the group consisting of titanium, zirconium, hafnium, vanadium, niobium, tantalum, chromium, molybdenum, aluminum, and silicon, and at least one element selected from the group consisting of nitrogen, carbon, boron, and oxygen, and a solid solution derived from the first compound, the first phase contains cobalt, tungsten, and at least one first element selected from the group consisting of the elements contained in the binder phase, the total content of cobalt and tungsten in the cubic boron nitride sintered material is 1.0% by mass or more and 6.0% by mass or less, the binder phase consists of multiple binder phase particles, the multiple binder phase particles contain 50% or more of first binder phase particles on a number basis, surfaces of the first binder phase particles include 50% by area or more of a first region, and the first region is in contact with the first phase.

The cubic boron nitride sintered material of the present disclosure enables providing a tool having a long tool life even in high-efficiency machining of high-hardness steel in the case where the cubic boron nitride sintered material is used as a tool material. It is conjectured that the reason therefor is as follows.

(i) The cubic boron nitride sintered material of the present disclosure contains the cubic boron nitride particles, having high strength and toughness, at 25% by volume or more and 80% by volume or less. The cubic boron nitride sintered material can therefore also have high strength and toughness. Accordingly, the tool containing the cubic boron nitride sintered material can have high abrasion resistance and breakage resistance even in high-efficiency machining of high-hardness steel.

(ii) In the cubic boron nitride sintered material of the present disclosure, the binder phase contains either or both of the one or more first compounds consisting of at least one element selected from the group consisting of titanium, zirconium, hafnium, vanadium, niobium, tantalum, chromium, molybdenum, aluminum, and silicon, and at least one element selected from the group consisting of nitrogen, carbon, boron, and oxygen, and the solid solution derived from the first compound.

The first compound itself has high strength and toughness, and improves the binding force between the cBN particles. Accordingly, the tool containing the cubic boron nitride sintered material containing the first compound as the binder phase can have high abrasion resistance and breakage resistance even in high-efficiency machining of high-hardness steel.

(iii) The cubic boron nitride sintered material of the present disclosure contains the first phase containing cobalt, tungsten, and the at least one first element selected from the elements contained in the binding phase. The first phase can improve the binding force between the binding phase particles. In the cubic boron nitride sintered material of the present disclosure, the number-based percentage of the first binder phase particles, having surfaces 50% or more of which are in contact with the first phase, to all the binder phase particles is 50% or more, so that the binding force between the binder phase particles is improved. Accordingly, the tool of the present disclosure containing the cubic boron nitride sintered material can have high abrasion resistance and breakage resistance even in high-efficiency machining of high-hardness steel.

In the present disclosure, examples of the high-hardness steel include chromium-molybdenum steel (SCM415). Although it was explained above that the tool containing the cubic boron nitride sintered material of the present disclosure has a long tool life in high-efficiency machining of high-hardness steel, the material to be cut is not limited thereto. Examples of the material to be cut include high-strength cast iron material (for example, FCD700), carbon steel for machine structural use (for example, S50C), high carbon chromium bearing steel (for example, SUJ2 and SUJ4), or alloy tool steel (for example, SKD11).

<Composition of Cubic Boron Nitride Sintered Material>

The cubic boron nitride sintered material of Embodiment 1 comprises the cubic boron nitride particles, the binder phase, and the first phase.

In the cubic boron nitride sintered material of Embodiment 1, the content of the cubic boron nitride particles is 25% by volume or more and 80% by volume or less. The lower limit of the content of the cubic boron nitride particles in the cubic boron nitride sintered material is 25% by volume or more, or may be 30% by volume or more, 35% by volume or more, or 40% by volume or more from the viewpoint of improvement in hardness. The upper limit of the content of the cubic boron nitride particles in the cubic boron nitride sintered material is 80% by volume or less, and may be 75% by volume or less, 70% by volume or less, or 65% by volume or less from the viewpoint of improvement in toughness. The content of the cubic boron nitride particles in the cubic boron nitride sintered material is 25% by volume or more and 80% by volume or less, and may be 25% by volume or more and 75% by volume or less, 25% by volume or more and 70% by volume or less, 30% by volume or more and 70% by volume or less, or 40% by volume or more and 65% by volume or less.

In the present disclosure, the content of the cubic boron nitride particles in the cubic boron nitride sintered material is measured in the following procedure with an energy dispersive X-ray analyzer (EDX) ("Octane Elect EDS System"™), which is available from EDAX, Inc.) (hereinafter also described as "an SEM-EDX") attached to a scanning electron microscope (SEM) ("JSM-7800F"™), which is available from JEOL Ltd.).

The cubic boron nitride sintered material is cut at a random point, and a cross section of the cubic boron nitride sintered material is exposed and polished. For example, a focused ion beam apparatus or a cross-section polisher can be used for cutting the cubic boron nitride sintered material. If the cubic boron nitride sintered material is used as a portion of the tool, the portion made of the cubic boron nitride sintered material is cut out, for example, with diamond-electrodeposited wire to expose a sample including a cross section of the cubic boron nitride sintered material.

The cross section is then observed at 5000 times through an SEM to obtain a reflected electron image. In the reflected electron image, regions in which cBN particles are present are shown as black regions, and regions in which the binder phase and the first phase are present are shown as gray regions or white regions.

The reflected electron image is then subjected to binarization processing by image analysis software ("WinROOF 2018" from MITANI Corporation) so that only the cBN particles are extracted. In the image subjected to the binarization processing, the cBN particles are shown as dark fields (black), and the binder phase and the first phase are shown as light fields (white). In the image subjected to the binarization processing, the percentage of the area of the pixels derived from the dark fields (pixels derived from the cBN particles) to the area of the whole measurement visual field (hereinafter also described as the "percentage by area of the cBN particles") is calculated.

The above-mentioned percentages by area of the cBN particles are measured in five measurement visual fields not overlapping each other to calculate the average of the area percentages of the cBN particles in the five measurement visual fields. In the present disclosure, the average of the area percentages of the cBN particles in the five measurement visual fields corresponds to the content (% by volume) of the cubic boron nitride particles in the cubic boron nitride sintered material.

Even though the applicant sets five measurement visual fields on the identical sample randomly to measure the contents of the cubic boron nitride particles in the cubic boron nitride sintered material in accordance with the above-mentioned procedure multiple times, it has been confirmed that the results of measurement scarcely vary.

The cubic boron nitride sintered material of Embodiment 1 can consist of the cubic boron nitride particles, the binder phase, and the first phase. As long as the effect of the present disclosure is not deteriorated, the cubic boron nitride sintered material of Embodiment 1 can contain impurities due to the raw materials and the manufacturing conditions besides the cubic boron nitride particles, the binder phase, and the first phase. The cubic boron nitride sintered material of Embodiment 1 can consist of the cubic boron nitride particles, the binder phase, the first phase, and the impurities. Examples of the impurities include nickel. If the cubic boron nitride sintered material contains the impurities, the content of the impurities in the cubic boron nitride sintered material can be 0.1% by mass or less. The content of the impurities in the cubic boron nitride sintered material can be measured by secondary ion mass spectrometry (SIMS).

<Cubic Boron Nitride Particles>

<<Composition of Cubic Boron Nitride Particles>>

In Embodiment 1, the cubic boron nitride particles consist of cubic boron nitride. As long as the effect of the present disclosure is not deteriorated, the cubic boron nitride particles can contain impurities together with cubic boron nitride. If the cubic boron nitride particles contain the impurities, the content of the impurities in the cubic boron nitride particles can be 0.1% by mass or less. The content of the impurities in the cubic boron nitride particles can be measured by secondary ion mass spectrometry (SIMS).

<<Average Particle Size of Cubic Boron Nitride Particles>>

In the cubic boron nitride sintered material of Embodiment 1, the cubic boron nitride particles may have any average particle size, and can have an average particle size common to conventional cubic boron nitride sintered materials. The cubic boron nitride particles may have a particle size of, for example, 0.1 μm or more and 10 μm or less.

In the present disclosure, the average particle size of the cubic boron nitride particles is measured in the following procedure. The cross section of the cBN sintered material is exposed and polished by the same method as in the procedure for measuring the content of the cubic boron nitride particles in the cubic boron nitride sintered material.

The polished surface is then observed at 10,000 times through the SEM to obtain an SEM image. In the SEM image, a rectangular measurement visual field with a size of 12 μm×15 μm is set. The SEM image is processed by image analysis software ("WinROOF ver. 7.4.5" from MITANI Corporation) to obtain the equivalent circle diameters of the cBN particles observed in the measurement visual field. The arithmetic mean of the equivalent circle diameters of all the cBN particles in the measurement visual field is calculated. The arithmetic mean corresponds to the average particle size of the cBN particles in the measurement visual field.

The above-mentioned measurement is performed in five measurement visual fields not overlapping each other. The arithmetic mean of the average particle sizes of the cBN particles in the five measurement visual fields is calculated. In the present disclosure, the arithmetic mean of the average particle sizes in the five measurement visual fields corresponds to the average particle size of the cubic boron nitride particles.

Even though the applicant sets five measurement visual fields on the identical sample randomly to measure the average particle size of the cubic boron nitride particles in accordance with the above-mentioned procedure multiple times, it has been confirmed that the results of measurement scarcely vary.

<Binder Phase>

In the cubic boron nitride sintered material of Embodiment 1, the binder phase contains either or both of one or more first compounds consisting of at least one element selected from the group consisting of titanium (Ti), zirconium (Zr), hafnium (Hf), vanadium (V), niobium (Nb), tantalum, chromium, molybdenum, aluminum, and silicon (hereinafter also described in "a second element(s)") and at least one element selected from the group consisting of nitrogen, carbon, boron, and oxygen and a solid solution derived from the first compound.

The binder phase can be any of the following aspects.

(i) The binder phase contains the first compound.

(ii) The binder phase consists of the first compound.

(iii) The binder phase contains the solid solution derived from the first compound.

(iv) The binder phase consists of the solid solution derived from the first compound.

(v) The binder phase contains the first compound and the solid solution derived from the first compound.

(vi) The binder phase consists of the first compound and the solid solution derived from the first compound.

As long as the effect of the present disclosure is not deteriorated, the binder phase can contain impurities together with either or both of the first compound and the solid solution derived from the first compound. If the binder phase contains the impurities, the content of the impurities in the binder phase can be 0.1% by mass or less. The content of the impurities in the binder phase can be measured by secondary ion mass spectrometry (SIMS).

Examples of the first compound consisting of the second element(s) and nitrogen (nitride) include titanium nitride (TiN), zirconium nitride (ZrN), hafnium nitride (HfN), vanadium nitride (VN), niobium nitride (NbN), tantalum nitride (TaN), chromium nitride ($Cr_2N$), molybdenum nitride (MoN), AlN (aluminum nitride), silicon nitride ($Si_3N_4$), titanium zirconium nitride (TiZrN), titanium hafnium nitride (TiHfN), titanium vanadium nitride (TiVN), titanium niobium nitride (TiNbN), titanium tantalum nitride (TiTaN), titanium chromium nitride (TiCrN), titanium molybdenum nitride (TiMoN), zirconium hafnium nitride (ZrHfN), zirconium vanadium nitride (ZrVN), zirconium niobium nitride (ZrNbN), zirconium tantalum nitride (ZrTaN), zirconium chromium nitride (ZrCrN), zirconium molybdenum nitride (ZrMON), hafnium vanadium nitride (HfVN), hafnium niobium nitride (HfNbN), hafnium tantalum nitride (HfTaN), hafnium chromium nitride (HfCrN), hafnium molybdenum nitride (HfMoN), vanadium niobium nitride (VNbN), vanadium tantalum nitride (VTaN), vanadium chromium nitride (VCrN), vanadium molybdenum nitride (VMoN), niobium tantalum nitride (NbTaN), niobium chromium nitride (NbCrN), niobium molybdenum nitride (NbMoN), tantalum chromium nitride (TaCrN), tantalum molybdenum nitride (TaMoN), chromium molybdenum nitride (CrMoN), or titanium aluminum nitride (TiAlN, $Ti_2AlN$, and $Ti_3AlN$).

Examples of the first compound consisting of the second element(s) and carbon (carbide) include titanium carbide (TiC), zirconium carbide (ZrC), hafnium carbide (HfC), vanadium carbide (VC), niobium carbide (NbC), tantalum carbide (TaC), chromium carbide ($Cr_2C$), molybdenum carbide (MoC), silicon carbide (SiC), titanium zirconium carbide (TiZrC), titanium hafnium carbide (TiHfC), titanium vanadium carbide (TiVC), titanium niobium carbide (TiNbC), titanium tantalum carbide (TiTaC), titanium chromium carbide (TiCrC), titanium molybdenum carbide (TiMoC), zirconium hafnium carbide (ZrHfC), zirconium vanadium carbide (ZrVC), zirconium niobium carbide (ZrNbC), zirconium tantalum carbide (ZrTaC), zirconium chromium carbide (ZrCrC), zirconium molybdenum carbide (ZrMoC), hafnium vanadium carbide (HfVC), hafnium niobium carbide (HfNbC), hafnium tantalum carbide (HfaC), hafnium chromium carbide (HfCrC), haffnium molybdenum carbide (HfMIoC), vanadium niobium carbide (VNbC), vanadium tantalum carbide (VTaC), vanadium chromium carbide (VCrC), vanadium molybdenum carbide (VMoC), niobium tantalum carbide (NbTaC), niobium chromium carbide (NbCrC), niobium molybdenum carbide (NbMoC), tantalum chromium carbide (TaCrC), tantalum molybdenum carbide (TaMoC), chromium molybdenum carbide (CrMoC), or titanium aluminum carbide (TiAlC, $Ti_2AlC$, and $Ti_3AlC$).

Examples of the first compound consisting of the second element(s), carbon, and nitrogen (carbonitride) include titanium carbonitride (TiCN), zirconium carbonitride (ZrCN), hafnium carbonitride (HfCN), or titanium aluminum carbonitride (TiAlCN, $Ti_2AlCN$, and $Ti_3AlCN$).

Examples of the first compound consisting of the second element and boron (boride) include titanium boride ($TiB_2$), zirconium boride ($ZrB_2$), hafnium boride ($HfB_2$), vanadium boride ($VB_2$), niobium boride ($NbB_2$), tantalum boride ($TaB_2$), chromium boride ($CrB_2$), molybdenum boride ($MoB_2$), or silicon boride ($SiB_4$).

Examples of the first compound consisting of the second element and oxygen (oxide) include titanium oxide ($TiO_2$), zirconium oxide ($ZrO_2$), hafnium oxide ($HfO_2$), vanadium oxide ($V_2O_5$), niobium oxide ($Nb_2O_5$), tantalum oxide ($Ta_2O_5$), chromium oxide ($Cr_2O_3$), molybdenum oxide ($MoO_3$), aluminum oxide ($Al_2O_3$), or silicon oxide ($SiO_2$).

Examples of the first compound consisting of the second element(s), nitrogen, and oxygen (oxynitride) include titanium oxynitride (TiON), zirconium oxynitride (ZrON), hafnium oxynitride (HfON), vanadium oxynitride (VON), niobium oxynitride (NbON), tantalum oxynitride (TaON), chromium oxynitride (CrON), molybdenum oxynitride (MoON), or SiAlON (sialon).

The binder phase may contain at least one element selected from the group consisting of titanium, chromium, aluminum, carbon, nitrogen, and boron.

The first compound can consist of at least one selected from the group consisting of TiN, TiCN, TiC, CrN, AlCrN, and $Al_2O_3$. The first compound may be used alone or in combination of two or more.

The binder phase can contain the solid solution derived from the first compound. The solid solution derived from the first compound as used herein means a state in which two or more first compounds are dissolved in each other in the crystal structure, and means an interstitial solid solution or a substitutional solid solution.

In the present disclosure, the composition of the binder phase is identified by X-ray diffraction in the following procedure. A cross section of the cBN sintered material is exposed and polished in the same method as in the procedure for measuring the content of the cubic boron nitride particles in the cubic boron nitride sintered material.

The X-ray diffraction spectrum of the polished surface is obtained with an X-ray diffractor ("MiniFlex 600"™), which is available from Rigaku Corporation). The conditions for the X-ray diffractor are as follows.

Characteristic X-ray: Cu—Kα (wavelength: 1.54 Å)
Tube voltage: 45 kV
Tube current: 40 mA
Filter: Multilayer mirror
Optical system: concentration
X-ray diffraction method: θ-2θ method The composition of the binder phase is identified based on the obtained X-ray diffraction spectrum.

<First Phase>

In the cubic boron nitride sintered material of Embodiment 1, the first phase contains cobalt, tungsten, and the at least one first element selected from the group consisting of the elements contained in the binder phase. The first element is an element except tungsten among the elements contained in the binder phase. The first element is at least one element selected from the group consisting of elements that are identical with the elements contained in the binder phase among titanium, zirconium, hafnium, vanadium, niobium, tantalum, chromium, molybdenum, aluminum, silicon, nitrogen, carbon, boron, and oxygen. For example, if the binder phase consists of TiCN, the first element is at least one element selected from the group consisting of Ti, C, and N. If the first phase contains at least one of the elements that are identical with the elements contained in the binder phase besides cobalt and tungsten, the binding force between the binder phase particles can be improved.

The first element may contain at least one element selected from the group consisting of aluminum, carbon, nitrogen, boron, and silicon. This further improves the binding force between the binder phase particles.

In the present disclosure, it is confirmed in the following procedure that the cubic boron nitride sintered material contains the first phase.

(A1) A sample is collected from the cubic boron nitride sintered material and thinned to a thickness of 30 to 100 nm with an argon ion slicer to prepare a slice. The slice is then observed at 10,000 times through a transmission electron microscope (TEM) ("JEM-2100F/Cs"™), which is available from JEOL Ltd.) to obtain a TEM image.

(A2) An elemental mapping image of cobalt and an elemental mapping image of tungsten are obtained based on the TEM image with an energy dispersive X-ray analyzer (EDX) ("EDAX"™), which is available from AMETEK, Inc.) attached to the TEM.

(A3) The elemental mapping image of cobalt and the elemental mapping image of tungsten are superimposed by image analysis software ("WinROOF 2018", which is available from MITANI Corporation). Regions in which cobalt and tungsten coexist continuously (hereinafter also described as "W—Co regions") are specified in the superimposed image (hereinafter also described as an "image A").

(A4) The elements constituting the binder phase are specified based on the composition of the binder phase measured by the X-ray diffraction. A TEM image in the same visual field as in the above-mentioned (A1) is subjected to elemental mapping analysis with an electron energy loss spectrometer (EELS) attached to the TEM to obtain elemental mapping images of the elements (hereinafter also described as "images B").

(A5) The image A in the above-mentioned (A3) is superimposed on the images B in above-mentioned (A4) by the image analysis software. If at least one of the elements constituting the binder phase specified in the images B coexists in the W—Co regions in the image A in the superimposed image (hereinafter also described as an "image C"), it is confirmed that the cubic boron nitride sintered material contains the first phase.

In the cubic boron nitride sintered material of Embodiment 1, the total content of cobalt and tungsten in the cubic boron nitride sintered material is 1.0% by mass or more and 6.0% by mass or less. The lower limit of the total content of cobalt and tungsten in the cubic boron nitride sintered material is 1.0% by mass or more, and may be 1.4% by mass or more, 1.5% by mass or more, 1.8% by mass or more, 2.0% by mass or more, 2.5% by mass or more, or 3.0% by mass or more from the viewpoint of improvement in the binding force between the binder phase particles. The upper limit of the total content of cobalt and tungsten in the cubic boron nitride sintered material is 6.0% by mass or less, and may be 5.8% by mass or less, 5.7% by mass or less, 5.5% by mass or less, 5.2% by mass or less, 5.0% by mass or less, 4.5% by mass or less, or 4.0% by mass or less from the viewpoint of suppressing a deterioration in abrasion resistance due to the coarsening of the first phase. The total content of cobalt and tungsten in the cubic boron nitride sintered material may be 1.4% by mass or more and 5.8% by mass or less, 1.5% by mass or more and 5.7% by mass or less, 1.8% by mass or more and 5.5% by mass or less, 2.0% by mass or more and 5.2% by mass or less, 2.5% by mass or more and 5.0% by mass or less, or 3,0% by mass or more and 4.5% by mass or less.

In the present disclosure, the total content by mass of cobalt and tungsten in the cubic boron nitride sintered material is measured by ICP mass spectrometry.

<Thickness of First Phase>

In the cubic boron nitride sintered material of Embodiment 1, the first phase may have a thickness of 20 nm or less, 0.6 nm or more and 20 nm or less, or 5 nm or more and 10 nm or less.

In the present disclosure, the thickness of the first phase is confirmed in the following procedure. The first phase is specified in the same procedure as in (A1) to (A5) in the method for confirming that the cubic boron nitride sintered material contains the first phase. The TEM image is subjected to linear analysis in a direction perpendicular to the extending direction of a first phase with the EDX. The full width at half maximum of the peak of tungsten is considered to be the thickness of the first phase. First phase at ten random different points is measured for thickness. The average value thereof is calculated. If the thickness of a first phase is less than 0.5 nm, the thickness is however excluded as noise from the calculation of the average value. In the present disclosure, the average value corresponds to the thickness of the first phase. It has been confirmed that as long as the identical cubic boron nitride sintered material is measured even at changed measurement points, almost the same results are obtained.

<Tungsten Content and Cobalt Content in First Phase>

In the cubic boron nitride sintered material of Embodiment 1, the tungsten content in the first phase may be higher than the cobalt content in the first phase.

In the present disclosure, the tungsten content and the cobalt content in the first phase are measured in the following procedure. The first phase is subjected to linear analysis in the same procedure as in the method for measuring the thickness of the first phase. The content (% by atom) at the peak of tungsten is considered to be the tungsten content in the first phase. The content (% by atom) at the peak of cobalt is considered to be the cobalt content in the first phase. First phase at ten random different points is measured for the tungsten content and the cobalt content. The average values thereof are calculated. In the present disclosure, the average value of the tungsten contents corresponds to the tungsten content in the first phase. In the present disclosure, the average value of the cobalt contents corresponds to the cobalt content in the first phase. It has been confirmed that as long as the identical cubic boron nitride sintered material is measured even at changed measurement points, almost the same results are obtained.

<Binder Phase Particles>

In the cubic boron nitride sintered material of Embodiment 1, the binder phase consists of the multiple binder phase particles. The multiple binder phase particles contain 50% or more of the first binder phase particles on a number basis. The surfaces of the first binder phase particles include 50% by area or more of the first region. The first region is in contact with the first phase. In the cubic boron nitride sintered material of Embodiment 1, the number-based percentage of the first binder phase particles, having surfaces 50% by area or more of which are in contact with the first phase, to all the binder phase particles is 50% or more, so that the binding force between the binder phase particles is improved.

The lower limit of the number-based percentage of the first binder phase particles to all the binder phase particles is 50% or more, and may be 55% or more, 60% or more, 70% or more, 75% or more, 80% or more, or 95% or more from the viewpoint of improvement in the binding force between the binder phase particles. The number-based percentage of the first binder phase particles to all the binder phase particles may be 100%.

In the cubic boron nitride sintered material of Embodiment 1, the multiple binder phase particles contain 50% or more of the second binder phase particles on a number basis, and the surfaces of the second binder phase particles may include 75% by area or more of the first region. This further improves the binding force between the binder phase particles.

The lower limit of the number-based percentage of the second binder phase particles to all the binder phase particles may be 50% or more, 55% or more, 60% or more, 70% or more, 75% or more, 80% or more, or 95% or more from the viewpoint of improvement in the binding force between the binder phase particles. The number-based percentage of the second binder phase particles to all the binder phase particles may be 100%.

In the present disclosure, the number-based content (percentage) of the first binder phase particles with respect to the multiple binder phase particles in the cubic boron nitride sintered material and the number-based content (percentage) of the second binder phase particles with respect to the multiple binder phase particles in the cubic boron nitride sintered material are measured in the following procedure with an energy dispersive X-ray analyzer (EDX) ("EDAX"™), which is available from AMETEK, Inc.) attached to a transmission electron microscope (TEM) ("JEM-2100F/Cs"™), which is available from JEOL Ltd.).

(B1) A sample is collected from the cubic boron nitride sintered material and thinned to a thickness of 30 to 100 nm with an argon ion slicer to prepare a slice. The slice is then observed at 10,000 times through a TEM to obtain a TEM image.

(B2) The elements constituting the binder phase are specified based on the results of the composition of the binder phase measured by X-ray diffraction. The elements constituting the binder phase are subjected to elemental mapping analysis with the EDX to obtain the elemental mapping images of the elements. Furthermore, the elemental mapping image of cobalt in the same visual field is obtained.

(B3) The elemental mapping images of the elements constituting the binder phase are superimposed by image analysis software ("WinROOF 2018", which is available from MITANI Corporation) to extract regions in which the elements are superimposed. The elemental mapping image of cobalt is superimposed on the extracted regions. Regions not overlapping cobalt among the extracted regions correspond to the binder phase.

(B4) In a TEM image in the identical visual field with the elemental mapping images in the above-mentioned (B2), the regions corresponding to the binder phase and specified in the above-mentioned (B3) are measured for crystal orientation with a crystal orientation analyzer attached to the TEM ("ASTER (ACOM)"™"), which is available from Nano Megas) and image analysis software ("DIM ver. 8" attached to the TEM, which software is available from TSL Solutions). If the difference in crystal orientation between adjacent measurement points is 5° or more, it is conceivable that a grain boundary is between the points. Portions other than the grain boundaries are defined as crystal grains. This enables specifying the grain boundaries between the binder phase particles.

A TEM image in the identical visual field with the visual field of the elemental mapping images in the above-mentioned (B2) can also be subjected to binarization processing and processing for separating grains by image analysis soft are ("WinROOF 2018", which is available from MITANI Corporation) to specify the grain boundaries between the binder phase particles. In the image subjected to the binarization processing and obtained here (hereinafter also described in a "first A image"), the numerical value of the pixels on the grain boundaries is 255, and the numerical value of the pixels in the other regions is 0.

(B5) The image obtained in the above-mentioned (B4) and showing the specified grain boundaries between the binder phase particles is subjected to binarization processing by the image analysis software ("WinROOF 2018", which is available from MITANI Corporation) to obtain an image showing the extracted grain boundaries between the binder phase particles (hereinafter also described as a "first image"). In the first image, the numerical value of the pixels on the grain boundaries is 255, and the numerical value of the pixels in the other regions is 0. In the following step, the above-mentioned first A image, obtained in (B4), may be substituted for the first image.

(B6) A TEM image in the identical visual field with the visual field of the above-mentioned first image (or the first A image) is processed with the EDX to obtain an elemental mapping image of tungsten and an elemental mapping image of cobalt. The elemental mapping image of tungsten and the elemental mapping image of cobalt are subjected to binarization processing by the image analysis software. In the binarized elemental mapping image of tungsten (hereinafter also described as a "second image"), the numerical value of the pixels in the regions in which tungsten is present is 255, and the numerical value of the pixels in the other regions is 0. In the binarized elemental mapping image of cobalt (hereinafter also described as a "third image"), the numerical value of the pixels in the regions in which cobalt is present is 255, and the numerical value of the pixels in the other regions is 0.

(B37) The second image is superimposed on the third image by the image analysis software. Regions in which the numerical value of the pixels is 255 (hereinafter also described as "W—Co phases") are specified in the superimposed image (hereinafter also described as a "fourth image").

In the above-mentioned (B1), the slice can be observed through the TEM at an observation magnification of 10,000,000 instead of the above-mentioned (B36) and (B7). This also enables obtaining an image showing specified W—Co phases (hereinafter also described as a "fourth A image").

(B8) In the first image (or the first A image), a rectangular measurement visual field with a size of 12 µm×15 µm is set by the image analysis software. Each of all the binder phase particles in the measurement visual field is measured for the length L1 of the grain boundary defining the peripheries of the binder phase particle. The first image (or first A image) is superimposed on the fourth image (or fourth A image at a magnification adjusted to the magnification of the first image). In the superimposed image, the measurement visual field of the identical region with the above is set. Each of all the binder phase particles in the measurement visual field is measured for the length L2 of the W—Co phase that are present at positions superimposed on the grain boundary defining the periphery of the binder phase particles. The percentage of L2 to L1, namely (L2/L1)×100, is calculated in each binder phase particle. The percentage, namely (L2/L1)×100, in the present disclosure corresponds to the rate of the surface of the binder phase particle covered with the first regions. Binder phase particles in which the percentage, namely (L2/L1)×100, is 50% or more correspond to the first binder phase particles. Binder phase particles in which the percentage, namely (L2/L1)×100, is 75% or more correspond to second binder phase particles. Binder phase particles may be partially present out of the measurement visual field near the peripheral area of the measurement visual field. Only binder phase particles that are wholly present within the measurement visual field are selected as the objects to be measured, if the binder phase particles are partially present out of the measurement visual field, the binder phase particles are excluded from the objects to be measured.

(B9) The percentage of the number of the first binder phase particles N2 to the number of all the binder phase particles N1 in the measurement visual field, (N2/N1)×100, is calculated. The percentages, (N2/N1)×100, is measured in three measurement visual fields not overlapping each other. The arithmetic mean of the percentages, (N2/N1)×100, in the three measurement visual fields is calculated. In the present disclosure, the arithmetic mean of the percentages, (N2/N1)×100, in the three measurement visual fields corresponds to the number-based content (percentage) of the first binder phase particles with respect to the multiple binder phase particles in the cubic boron nitride sintered material.

(B10) The percentage of the number of the second binder phase particles N3 to the number of all the binder phase particles N1 in the measurement visual field, (N3/N1)×100, is calculated. The percentages, (N3/N1)×100, is measured in three measurement visual fields not overlapping each other. The arithmetic mean of the percentages, (N3/N1)×100, in the three measurement visual fields is calculated. In the present disclosure, the arithmetic mean of the percentages, (N3/N1)×100, in the three measurement visual fields corresponds to the number-based content (percentage) of the second binder phase particles with respect to the multiple binder phase particles in the cubic boron nitride sintered material.

Even though the applicant set measurement visual fields at random positions on the identical cubic boron nitride sintered material to measure multiple times, it has been confirmed that the results of measurement scarcely vary.

<Average Particle Size of Binder Phase Particles>

In the cubic boron nitride sintered material of Embodiment 1, the binder phase particles may have any average particle size, and can have a common average particle size used in conventional cubic boron nitride sintered materials. The binder phase particles may have a particle size of 50 nm or more and 200 µm or less, for example.

In the present disclosure, the average particle size of the binder phase particles is measured in the following procedure. The first image showing the specified grain boundaries between the binder phase particles and described in the above-mentioned (B5) is obtained in the same method as in the method for measuring the number-based content (percentage) of the first binder phase particles to the multiple binder phase particles of the cubic boron nitride sintered material.

In the first image, a rectangular measurement visual field with a size of 12 µm×15 µm is then set. The first image is processed by image analysis software ("WinROOF ver. 7.4.5" from MITANI Corporation) to obtain the equivalent circle diameters of the binder phase particles observed in the measurement visual field. The arithmetic mean of the equivalent circle diameters of all the binder phase particles in the measurement visual field is calculated. The arithmetic mean corresponds to the average particle size of the binder phase particles in the measurement visual field.

The above-mentioned measurement is performed in five measurement visual fields not overlapping each other. The arithmetic mean of the average particle sizes of the binder phase particles in the five measurement visual fields is calculated. In the present disclosure, the arithmetic mean of the average particle sizes in the five measurement visual fields corresponds to the average particle size of the binder phase particles.

Even though the applicant set five measurement visual fields on the identical sample randomly to measure the average particle size of the binder phase particles in accordance with the above-mentioned procedure multiple times, it has been confirmed that the results of measurement scarcely vary.

<The Presence or Absence of First Phase on Interface Between Cubic Boron Nitride Particles and Binder Phase>

The first phase may be absent on the interface between the cubic boron nitride particles and the binder phase.

In the present disclosure, it is measured in the following procedure whether the first phase is present on the interface between the cubic boron nitride particles and the binder phase.

The binder phase and the W—Co phases (corresponding to the first phase) are specified in the TEM image in the same method as in the method for measuring the number-based content (percentage) of the first binder phase particles with respect to the multiple binder phases of the cubic boron nitride sintered material.

The identical TEM image with the above is subjected to the elemental mapping of boron and nitrogen. The elemental mapping images of boron and nitrogen are superimposed by the above-mentioned image analysis software to extract regions in which the elements are superimposed. The regions are considered to be the cubic boron nitride particles. The elemental mapping images of the elements constituting the binder phase are superimposed on the extracted regions to specify regions in which the cubic boron nitride particles are present and regions in which the binder phase are present.

The EDX performs linear analysis in the direction perpendicular to the extending direction of the interface between a random cubic boron nitride particle and a binder phase particle adjacent thereto at ten points equally dividing the length of the interface in the extending direction. If any first phase having a thickness of 0.5 nm or more is absent between the cubic boron nitride particle and the binder phase particle at eight or more points among the ten points, it is determined that any first phase is absent on the interface between the cubic boron nitride particle and the binder phase. As long as the identical cubic boron nitride sintered material is measured even at changed measurement points, it has been confirmed that almost the same results are obtained.

<Method for Manufacturing Cubic Boron Nitride Sintered Material>

A method for manufacturing the cubic boron nitride sintered material of Embodiment 1 will be described. For example, the method for manufacturing the cubic boron nitride sintered material of Embodiment 1 can comprise a raw material-preparing step, a mixing step, and a sintering step.

<<Raw Material-preparing Step (1)>>

Cubic boron nitride powder (hereinafter also described as "cBN powder") and binder phase raw material powders are prepared as the raw materials for the cubic boron nitride sintered material. Any well-known cBN powder can be used. The cBN powder may have any average particle size, and can have an average particle size of, for example, 0.1 to 12.0 μm.

The binder phase raw material powder containing elements constituting a binder phase is prepared as a raw material of the binder phase. The binder phase raw material powder, acetone or ethanol as a solvent, and cemented carbide balls are fed to a cemented carbide container for mixing (hereinafter also described as the "first mixing"). The cemented carbide contains tungsten carbide (WC) and cobalt (Co). For example, the cemented carbide is WC-6% Co. The first mixing adopts at least any of the following conditions A to C.

A. The mixing time is 120 hours or more and 240 hours or less.

B. The cemented carbide balls are used surface-coated with cobalt powder.

C. The cemented carbide balls are used having a larger particle size than usual, namely a diameter of 3 mm or more and 10 mm or less.

<<Mixing Step (1)>>

Subsequently to the above-mentioned raw material-preparing step (1), the cBN powder, the binder raw material powder mixed with the ball mill, acetone or ethanol, and balls are fed to a container made of cemented carbide for mixing (hereinafter also described as the "second mixing"). The second mixing adopts at least any of the following conditions D to F.

D. The cemented carbide balls are used having a smaller particle sizer than usual, namely a diameter of 0.5 mm or more and 3 mm or less.

E. If cBN powders having different particle sizes as a raw material are used, the c3N powder having a small particle size and the binder raw material powder are first mixed, and the cBN powders having a large particle size is fed thereto for mixing after 3 to 12 hours.

F. The balls are used made of material other than cemented carbide. Examples of the balls made of the material other than cemented carbide include balls made of silicon nitride or aluminum oxide.

After the mixing, the solvent is removed by air drying. Subsequent heat treatment volatilizes impurities such as moisture adsorbed on the surface of the mixed powder to purify the surface of the mixed powder.

<<Raw Material-preparing Step (2)>>

The first mixing is performed under the following condition G instead of the above-mentioned raw material-preparing step (1). The powder subjected to the first mixing may be further subjected to covering treatment for forming a covering having a target composition thereon under the conditions described in the following Covering treatment.

G. The cemented carbide balls are used having a diameter of 2.0 mm. The mixing time is set at 24 to 90 hours.

Covering Treatment

Coater: Nano particle forming apparatus, APD-P, which is available from ADVANCE RIKO, Inc.

Target: W at 30 to 60% by atom and Co at 70 to 40% by atom

Introduced gas: Ar

Film formation pressure: 0.88 Pa

Discharge voltage: 150 V

Discharge frequency: 6 Hz

Capacitor capacity: 1080 μF

The number of shots: 1000 to 10000

The number of revolutions of powder container: 50 rpm

Amount of powder to be treated: 30 g

<<Mixing Step (2)>>

Subsequently to the above-mentioned raw material-preparing step (2), the second mixing is performed instead of the above-mentioned mixing step (1) under the following condition H.

H. The cemented carbide balls are used having a diameter of 2.0 mm. The mixing time is set at 6 to 12 hours.

<<Sintering Step>>

A container made of Ta (tantalum) is filled with the mixed powder while the mixed powder remains in contact with a disk made of the cemented carbide WC-6% Co. The container is vacuum-sealed. The vacuum-sealed mixed powder is maintained under the conditions of 3 GPa or more and 12 GPa or less and 1100° C. or more and 2200° C. or less for 5 minutes or more and 30 minutes or less with a belt type ultra-high pressure and high temperature generator to be sintered. The cubic boron nitride sintered material of Embodiment 1 is manufactured thereby.

In the manufacturing process of the manufacturing method of PTL 1, to cBN powder and Ti compound particle powder are added W nanopowder having an average particle size of 500 nm or more and 900 nm or less and Co nanopowder having an average particle size of 20 nm or more and 40 nm or less for forming the W—Co phases in the cubic boron nitride sintered material. The powders are mixed, and the mixed powder is then sintered to manufacture cubic boron nitride sintered material. As a result of the examination, if the present inventors adopted the condition that the total content of cobalt and tungsten in the cubic boron nitride sintered material is low, namely 1.0% by mass or more and 6.0% by mass or less, in the manufacturing method of PTL 1, the surfaces of the binder phase particles are in contact with the W—Co phases in small regions, and among the binder phase particles in the cubic boron nitride sintered material, the number-based content of binder phase particles having surfaces 50% by area or more of which are in contact with the first phase was less than 50%. In the manufacturing method of PTL 1, it has been confirmed that the W—Co phases do not contain the elements contained in the binder phase.

The present inventors have earnestly examined and consequently found that the adoption of the combination of at least any of the above-mentioned A to C and at least any of the above-mentioned D to F or the combination of the above-mentioned G, Covering treatment, and the condition H enables increasing the regions in which the surfaces of the binder phase particles are in contact with the first phase, and enables, among the binder phase particles in the cubic boron nitride sintered material, the number-based content of the binder phase particles having the surfaces 50% by area or more of which are in contact with the first phase to be 50% or more. The present inventors have further found that the first phase contains the elements contained in the binder phase besides tungsten and cobalt.

It is conjectured that the adoption of at least any of the above-mentioned conditions A to C facilitates contacting tungsten and cobalt contained in the cemented carbide container or the cemented carbide balls with the surfaces of the binder phase particles to react the surfaces of the binder phase particles with the first phase.

The adoption of at least any of the above-mentioned conditions D to F enables suppressing the crush of the cBN particles during the mixing to reduce the reactivity of the small crushed cBN particles with tungsten and cobalt constituting the first phase during the sintering. This enables reacting the binder phase particles with tungsten and cobalt more efficiently.

Embodiment 2: Tool

A tool according to an embodiment of the present disclosure (hereinafter also described as "Embodiment 2") contains the cubic boron nitride sintered material of Embodiment 1. The whole of the tool may be constituted of the cubic boron nitride sintered material, or only part thereof (for example, the cutting edge of the cutting tool) may be constituted of the cubic boron nitride sintered material. Furthermore, coating films may be formed on the surfaces of the cutting tools.

Examples of the cutting tool include drills, end mills, indexable cutting inserts for drills, indexable cutting inserts for end mills, indexable cutting inserts for milling, indexable cutting inserts for lathe turning machining, metal saws, gear-cutting tools, reamers, taps, and cutting bits.

Examples of wear-resistant tools include dies, scribers, scribing wheels, and dressers. Examples of grinding tools include grinding wheels.

EXAMPLES

The present embodiments will be described by Examples further specifically. The present embodiments are not, however, limited by these Examples.
<Manufacturing of Cubic Boron Nitride Sintered Material>
Cubic boron nitride sintered materials as samples were manufactured in the following procedure.
<Raw Material-Preparing Step>
Cubic boron nitride powders and binder phase raw material powder were prepared. Cubic boron nitride powders having two different average particle size were prepared for samples for which the condition E in Mixing step described later was adopted. The compositions of the binder phase raw material powders were selected so that the binder phases in the cubic boron nitride sintered materials to be manufactured contained the elements described in the column "Composition" of the "Binder phase" in Table 2.

Each binder phase raw material powder, acetone or ethanol as a solvent, and cemented carbide balls were fed to a cemented carbide container, followed by mixing under any of the following conditions A to C and G. The conditions adopted for the samples are as shown in the column "First mixing" in Table 1.

A. The mixing time is set at 120 hours or more and 240 hours or less. The cemented carbide balls are used having a diameter of 2.0 mm.

B. The cemented carbide balls (with a diameter of 2.0 mm) are used surface-coated with cobalt powder. The mixing time is set at 96 hours.

C. The cemented carbide balls are used having a diameter of 3 mm or more and 10 mm or less. The mixing time is set at 96 hours.

G. The cemented carbide balls are used having a diameter of 2.0 mm. The mixing time is set at 24 to 90 hours.

In each of Samples 26 to 32, the powder after the first mixing was then subjected to covering treatment tinder the conditions described in following Treatment I or Treatment J.

Treatment I

Coater: Nano particle forming apparatus, APD-P, which is available from ADVANCE RIKO, Inc.

Target: W at 60% by atom and Co at 40% by atom

Introduced gas: Ar

Film formation pressure: 0.88 Pa

Discharge voltage: 150 V

Discharge frequency: 6 Hz

Capacitor capacity: 1080 μF

The number of shots: 1000 to 10000

The number of revolutions of powder container: 50 rpm

Amount of powder to be treated: 30 g

Treatment J

In Treatment J, only Target in Treatment I was changed into the following.

Target: W at 30% by atom and Co at 70% by atom

<<Mixing Step>> cBN powder, each binder raw material powder mixed using the ball mill, acetone or ethanol, and balls were fed to a cemented carbide container, followed by mixing under any of the following conditions D to F and H. The conditions adopted for the samples are as shown in the column "Second mixing" in Table 1.

D. The cemented carbide balls are used having a diameter of 0.5 mm or more and 3 mm or less. The mixing time is set at 6 to 24 hours.

E. cBN powder having a small particle size is first mixed with each binder raw material powder. cBN powder having a large particle size is fed thereto after 12 hours and mixed therewith. The cemented carbide balls are used having a diameter of 2.0 mm.

F. The balls are used having a diameter of 2.0 mm and made of material other than cemented carbide. The mixing time is set at 6 to 24 hours.

H. The cemented carbide balls are used having a diameter of 2.0 mm. The mixing time is set at 6 to 12 hours.

The mixing ratios between the raw material powders were adjusted so that the contents of the cubic boron nitride particles (% by volume) in the cubic boron nitride sintered materials as the samples and the total contents of tungsten and cobalt (% by mass) in the cubic boron nitride sintered materials were as described in the column "cBN particles Content" and the column "W+Co Content" of the "Cubic boron nitride sintered material" in Table 2.

The mixed powders were air-dried and then heat-treated to volatilize impurities such as moisture adsorbed on the surfaces of the mixed powders, resulting in purifying the surfaces of the mixed powders.

<<Sintering Step>>

A container made of Ta (tantalum) is filled with each mixed powder while the mixed powder was in contact with a disk made of the cemented carbide WC-6% Co. The container is vacuum-sealed. The vacuum-sealed mixed powder was maintained under the conditions of 3 GPa or more and 12 GPa or less and 1100° C. or more and 2200° C. or less for 5 minutes or more and 30 minutes or less with a belt type ultra-high pressure and high temperature generator to be sintered. The cubic boron nitride sintered materials as the samples were manufactured thereby. The shape of the tools made of the cubic boron nitride sintered materials was referred to as DNGA150408.

TABLE 1

| Sample No. | Manufacturing step | |
| | First mixing | Second mixing |
| --- | --- | --- |
| 1 | C | H |
| 2 | A | H |
| 3 | G | E, F |
| 4 | B | H |
| 5 | A | H |
| 6 | C | H |
| 7 | A | H |
| 8 | C | H |
| 9 | A, B | H |
| 10 | G | D |
| 11 | A | H |
| 12 | B | H |
| 13 | B | E |
| 14 | A | D |
| 15 | C | D, F |
| 16 | B | H |
| 17 | A | F |
| 18 | A | H |
| 19 | A | D |
| 20 | B | H |
| 21 | C | E |
| 22 | A, B | H |

TABLE 1-continued

| Sample No. | Manufacturing step | |
| | First mixing | Second mixing |
| --- | --- | --- |
| 23 | B | H |
| 24 | G | D, E |
| 25 | A | F |
| 26 | G, I | H |
| 27 | G, I | H |
| 28 | G, I | H |
| 29 | G, I | H |
| 30 | G, I | H |
| 31 | G, I | H |
| 32 | G, J | H |
| 101 | G | H |
| 102 | G | H |
| 103 | G | H |
| 104 | G | H |
| 105 | G | H |
| 106 | G | H |
| 107 | G | H |

<Evaluation of Cubic Boron Nitride Sintered Materials>

<<Content of Cubic Boron Nitride Particles>>

The cubic boron nitride sintered materials as the samples were measured for the contents of the cubic boron nitride particles of the cubic boron nitride sintered material with an SEM-EDX. The specific measuring method is as described in Embodiment 1. The results are shown in the column "cBN particles Content" of "Cubic boron nitride sintered material" in Table 2.

<<Average Particle Size of Cubic Boron Nitride Particles>>

It was confirmed that in all the cubic boron nitride sintered materials as the samples, the cubic boron nitride particles had an average particle size of 0.1 μm or more and 10 μm or less.

<<Composition of Binder Phase>>

In the cubic boron nitride sintered materials as the samples, the compositions of the binder phases were identified by X-ray diffraction. The specific identification method is as described in Embodiment 1. The results of the elements contained in the binder phases are shown in the column "Binder phase Composition" in Table 2.

<<Presence or Absence of First Phase and Types of First Elements Contained in First Phase>>

It was confirmed whether the cubic boron nitride sintered materials as the samples contained the first phase. The specific method for confirmation is as described in Embodiment 1. The results are shown in the column "Present/Absent" of "First phase" in Table 2. The "Present" means that the cubic boron nitride sintered material contains the first phase. The "Absent" means that the cubic boron nitride sintered material does not contain the first phase. The first element(s) contained in the first phase in the samples in which the first phase is "Present" is (are) shown in the column "First element" of "First phase" in Table 2.

<<Content of First Binder Phase Particles in Binder Phase Particles and Content of Second Binder Phase Particles in Binder Phase Particles>>

Each cubic boron nitride sintered material of the sample was measured for the number-based content of the first binder phase particles in the binder phase particles and the number-based content of the second binder phase particles in the binder phase particles. The specific measuring method is as described in Embodiment 1 The results are shown in the columns "First binder phase particles" and "Second binder phase particles" of "Binder phase" in Table 2.

<<Total Content of Cobalt and Tungsten in Cubic Boron Nitride Sintered Material>>

Each cubic boron nitride sintered material of the sample was measured for the total content of cobalt and tungsten. The specific measuring method is as described in Embodiment 1. The results are shown in the column "W+Co Content" in Table 2.

Cutting Speed: $V = 150\,m/\min$.

Feed: $f = 0.08\,\mathrm{mm/rev}$.

Depth of cut: $ap = 0.1\,\mathrm{mm}$

TABLE 2

| | | Cubic boron nitride sintered material | | | | | |
|---|---|---|---|---|---|---|---|
| | cBN particles | | Binder phase | | | | |
| | | | First binder | Second binder | | First phase | W + Co |
| Sample No. | Content % by volume | Composition | phase particles % | phase particles % | Present/ Absent | First element Type | Content % by mass |
| 1 | 30 | Ti, Al, N, B, O, Si | 60 | 44 | Present | Al | 2.1 |
| 2 | 32 | Ti, Al, N, B, O, Si, C | 78 | 60 | Present | Al, C | 5.0 |
| 3 | 30 | Ti, Al, N, B, O, Si, Cr | 55 | 31 | Present | Al, Si, C | 2.2 |
| 4 | 34 | Al, N, B, O, Si, Cr | 75 | 63 | Present | Al, Cr | 5.2 |
| 5 | 29 | Ti, Al, C, B, O, Si | 80 | 71 | Present | Al, C, Si | 5.5 |
| 6 | 30 | Ti, Al, C, B, O, Si | 55 | 38 | Present | C, Si, Al | 1.5 |
| 7 | 50 | Ti, Al, N, B, O, Si | 70 | 62 | Present | Al, Si | 4.2 |
| 8 | 50 | Ti, Al, N, B, O, Si, C | 60 | 52 | Present | Al, C, Si | 4.0 |
| 9 | 51 | Ti, Al, N, B, O, Si, C | 85 | 79 | Present | Al, C, Si | 5.8 |
| 10 | 49 | Ti, Al, N, B, O, Si, Cr | 55 | 40 | Present | Al | 2.0 |
| 11 | 52 | Al, N, B, O, Si, Cr | 72 | 60 | Present | Al, Cr | 3.2 |
| 12 | 50 | Ti, Al, C, B, O, Si | 63 | 51 | Present | Al, C | 4.9 |
| 13 | 55 | Ti, Al, N, B, O, Si, C, Nb | 70 | 55 | Present | Al, C, Si, Nb | 4.2 |
| 14 | 54 | Ti, Al, N, B, O, Si, C, Nb | 80 | 69 | Present | Al, C, Si, Nb | 5.2 |
| 15 | 52 | Ti, Al, N, B, O, Si, C, Ta | 52 | 43 | Presen | Al, C, Si | 1.8 |
| 16 | 57 | Ti, Al, N, B, O, Si, C, Zr | 65 | 50 | Present | Al, C | 3.0 |
| 17 | 60 | Ti, Al, N, B, O, Si, C | 72 | 61 | Present | Al, C | 5.5 |
| 18 | 61 | Ti, Al, N, B, O, Si | 60 | 48 | Present | Al | 3.0 |
| 19 | 59 | Ti, Al, N, B, O, Si | 81 | 68 | Present | Al | 4.5 |
| 20 | 76 | Ti, Al, N, B, O, Si | 65 | 53 | Present | Al | 4.0 |
| 21 | 75 | Ti, Al, N, B, O, Si, Zr | 60 | 53 | Present | Al, Zr | 3.0 |
| 22 | 74 | Ti, Al, N, B, O, Si, Cr | 92 | 83 | Present | Al, Cr | 5.7 |
| 23 | 79 | Al, N, B, O, Si, Cr | 58 | 29 | Present | Al, Cr, Si | 3.3 |
| 24 | 78 | Al, N, B, O, Si, Cr, Ta | 55 | 21 | Present | Al | 1.4 |
| 25 | 80 | Ti, Al, C, B, O, Si | 80 | 65 | Present | Al, Si, C | 2.5 |
| 26 | 50 | Ti, Al, N, B, O, Si | 89 | 72 | Present | Al | 3.0 |
| 27 | 30 | Ti, Al, N, B, O, Si | 73 | 60 | Present | Al | 1.8 |
| 28 | 32 | Al, N, B, O, Si, C | 91 | 86 | Present | Al, Si, C | 2.5 |
| 29 | 75 | Al, N, B, O, Si, Cr | 55 | 35 | Present | Al, Si, Cr | 1.0 |
| 30 | 51 | Ti, Al, N, B, O, Si | 88 | 75 | Present | Al, Si | 5.5 |
| 31 | 55 | Ti, Al, N, B, O, Si, Cr | 91 | 83 | Present | Al, Si, Cr | 6.0 |
| 32 | 48 | Ti, Al, N, B, O, Si | 88 | 70 | Present | Al | 2.9 |
| 101 | 50 | Ti, Al, N, B, O, Si | 30 | 10 | Absent | — | 3.2 |
| 102 | 55 | Ti, Al, N, B, O, Si | 40 | 12 | Present | Si | 4.5 |
| 103 | 30 | Ti, Al, N, B, O, Si | 10 | 3 | Present | Al | 2.4 |
| 104 | 30 | Ti, Al, N, B, O, Si, C | 76 | 52 | Present | Al, C | 8.0 |
| 105 | 50 | Ti, Al, N, B, O, Si, C | 85 | 72 | Present | Al, Si, C | 12.0 |
| 106 | 75 | Al, N, B, O, Si, Cr | 20 | 8 | Present | Al, Si, Cr | 2.0 |
| 107 | 75 | Ti, Al, N, B, O, Si, Ta | 10 | 2 | Present | Al | 1.0 |

<Evaluation of Tool>

<<Samples 1 to 6, 103, and 104>>

The following Cutting Tests 1 and 2 were performed with tools consisting of the respective cubic boron nitride sintered materials as Samples 1 to 6, 103, and 104, containing the cubic boron nitride particles of the cubic boron nitride sintered material at a content of 25% by volume or more and 45% by volume or less, (shape: DNGA 150408). The conditions for Cutting Test 1 and Cutting Test 2 correspond to high-efficiency machining of high-hardness steel Cutting Test 1: Evaluation of Breakage Resistance Material to be cut: Round bar of high-hardness steel SCM415H, 5 flutes, HRC62, 100 mm in diameter×300 mm in length -continued Wet/Dry: Dry Cutting method: Intermittent cutting The cutting edge was observed per cutting distance of 0.15 km to measure the amount of the cutting edge dropped. The amount of the cutting edge dropped was defined as the width of the cutting edge recessed due to abrasion from the position of the cutting edge ridgeline before the cutting toward the flank face. In the case of breakage, the size of the cutting edge broken was defined as the amount of the cutting edge dropped. If the amount of the cutting edge dropped exceeded 0.04 mm, or the cutting distance reached 5.0 km, the cutting evaluation was finished, and the amount of the cutting edge dropped was measured. It is meant that as the amount of the cutting edge dropped decreases, the breakage resistance is improved, and the tool life is extended. If the amount of the cutting edge dropped is 0.04 mm or less at a cutting distance of 5.0 km, the sign "A" is described in "Cutting Test 1" in Table 3. If the amount of the cutting edge dropped is more than 0.04 mm at a cutting distance of 5.0 km or less, the sign "B" is described therein. The sign "A" means that the tool is high in breakage resistance, and has a long tool life. The sign "B" means that the tool has insufficient breakage resistance and a short tool life.

Cutting Test 2: Evaluation of Abrasion Resistance

Material to be cut: Round bar of high-hardness steel SCM415H, no flute, HRC62, 100 mm in diameter×300 mm in length $$\text{Cutting Speed: } V = 120 \, m/\min.$$

$$\text{Feed: } f = 0.1 \, mm/rev.$$

$$\text{Depth of cut: } ap = 0.1 \, mm$$

$$\text{Wet/Dry: Wet}$$

$$\text{Cutting method: Continuous cutting}$$

The cutting edge was observed per cutting distance of 0.5 km to measure the amount of the cutting edge dropped. The amount of the cutting edge dropped was defined as the width of the cutting edge recessed due to abrasion from the position of the cutting edge ridgeline before the cutting toward the flank face. If the amount of the cutting edge dropped exceeded 0.04 mm, or the cutting distance reached 10.0 km, the cutting evaluation was finished, and the amount of the cutting edge dropped was measured. It is meant that as the amount of the cutting edge dropped decreases, the abrasion resistance is improved, and the tool life is extended. If the amount of the cutting edge dropped is 0.04 mm or less at a cutting distance of 10.0 km, the sign "A" is described in "Cutting Test 2" in Table 3. If the amount of the cutting edge dropped is more than 0.04 mm at a cutting distance of 10.0 km or less, the sign "B" is described therein. The sign "A" means that the tool is high in abrasion resistance, and has a long tool life. The sign "B" means that the tool has insufficient abrasion resistance and a short tool life.

In the present Example, if the results of both Cutting Tests 1 and 2 are "A", it is determined that the tool life is long. If the results of either or both of Cutting Tests 1 and 2 are "B", it is determined that the tool life is insufficient.

TABLE 3

| Sample No. | Evaluation of tool | |
| | Cutting Test 1 | Cutting Test 2 |
| --- | --- | --- |
| 1 | A | A |
| 2 | A | A |
| 3 | A | A |
| 4 | A | A |
| 5 | A | A |
| 6 | A | A |
| 103 | B | A |
| 104 | A | B |

The cubic boron nitride sintered materials and the tools of Samples 1 to 6 correspond to Examples. The cubic boron nitride sintered materials and the tools of Samples 103 and 104 correspond to Comparative Examples. It was confirmed that the tools of Samples 1 to 6 had high breakage resistance and abrasion resistance, and a long tool life. It was confirmed that the tools of Samples 103 and 104 had either of insufficient breakage resistance and insufficient abrasion resistance, and had an insufficient tool life.

<<Samples 7 to 19, 101, 102, and 105>>

The following Cutting Tests 3 and 4 were performed with tools consisting of the respective cubic boron nitride sintered materials as samples 7 to 19, 101, 102, and 105, containing the cubic boron nitride particles of the cubic boron nitride sintered material at a content of more than 45% by volume and 65% by volume or less, (shape: DNGA 150408). The conditions for Cutting Test 3 and Cutting Test 4 correspond to high-efficiency machining of high-hardness steel.

Cutting Test 3: Evaluation of Breakage Resistance

Material to be cut: Round bar of high-hardness steel SCM415H, 5 flutes, HRC62, 100 mm in diameter×300 mm in length $$\text{Cutting Speed: } V = 150 \, m/\min.$$

$$\text{Feed: } f = 0.15 \, mm/rev.$$

$$\text{Depth of cut: } ap = 0.2 \, mm$$

$$\text{Wet/Dry: Dry}$$

$$\text{Cutting method: Intermittent cutting}$$

The cutting edge was observed per cutting distance of 0.15 km to measure the amount of the cutting edge dropped. The amount of the cutting edge dropped was defined as the width of the cutting edge recessed due to abrasion from the position of the cutting edge ridgeline before the cutting toward the flank face. In the case of breakage, the size of the cutting edge broken was defined as the amount of the cutting edge dropped. If the amount of the cutting edge dropped exceeded 0.04 mm, or the cutting distance reached 5.0 km, the cutting evaluation was finished, and the amount of the cutting edge dropped was measured. It is meant that as the amount of the cutting edge dropped decreases, the breakage resistance is improved, and the tool life is extended. If the amount of the cutting edge dropped is 0.04 mm or less at a cutting distance of 5.0 km, the sign "A" is described in "Cutting Test 3" in Table 4. If the amount of the cutting edge dropped is more than 0.04 mm at a cutting distance of 5.0 km or less, the sign "B" is described therein. The sign "A" means that the tool is high in breakage resistance, and has a long tool life. The sign "B" means that the tool has insufficient breakage resistance and a short tool life.

Cutting Test 4-: Evaluation of Abrasion Resistance

Material to be cut: Round bar of high-hardness steel SCM415H, no flute, HRC62, 100 mm in diameter×300 mm in length $$\text{Cutting Speed: } V = 120 \, m/\min.$$

$$\text{Feed: } f = 0.1 \, mm/rev.$$

$$\text{Depth of cut: } ap = 0.15 \, mm$$

$$\text{Wet/Dry: Wet}$$

$$\text{Cutting method: Continuous cutting}$$

The cutting edge was observed per cutting distance of 0.5 km to measure the amount of the cutting edge dropped. The amount of the cutting edge dropped was defined as the width of the cutting edge recessed due to abrasion from the position of the cutting edge ridgeline before the cutting toward the flank face. If the amount of the cutting edge dropped exceeded 0.04 mm, or the cutting distance reached 10.0 km, the cutting evaluation was finished, and the amount of the cutting edge dropped was measured. It is meant that as the amount of the cutting edge dropped decreases, the abrasion resistance is improved, and the tool life is extended. If the amount of the cutting edge dropped is 0.04 mm or less at a cutting distance of 10.0 km, the sign "A" is described in "Cutting Test 4" in Table 4. If the amount of the cutting edge dropped is more than 0.04 mm at a cutting distance of 10.0 km or less, the sign "B" is described therein. The sign "A" means that the tool is high in abrasion resistance, and has a long tool life. The sign "B" means that the tool has insufficient abrasion resistance and a short tool life.

In the present Example, if the results of both Cutting Tests 3 and 4 are "A", it is determined that the tool life is long. If the results of either or both of Cutting Tests 3 and 4 are "B", it is determined that the tool life is insufficient.

TABLE 4

| | Evaluation of tool | |
|---|---|---|
| Sample No. | Cutting Test 3 | Cutting Test 4 |
| 7 | A | A |
| 8 | A | A |
| 9 | A | A |
| 10 | A | A |
| 11 | A | A |
| 12 | A | A |
| 13 | A | A |
| 14 | A | A |
| 15 | A | A |
| 16 | A | A |
| 17 | A | A |
| 18 | A | A |
| 19 | A | A |
| 101 | B | A |
| 102 | B | A |
| 105 | A | B |

The cubic boron nitride sintered materials and the tools of Samples 7 to 19 correspond to Examples. The cubic boron nitride sintered materials and the tools of Samples 101, 102, and 105 correspond to Comparative Examples. It was confirmed that the tools of Samples 7 to 19 had high breakage resistance and abrasion resistance, and a long tool life. It was confirmed that the tools of Samples 101, 102, and 105 had either of insufficient breakage resistance and insufficient abrasion resistance, and had an insufficient tool life.

<<Samples 20 to 25, 106, and 107>>

The following Cutting Tests 5 and 6 were performed with tools consisting of the respective cubic boron nitride sintered materials as Samples 20 to 25, 106, and 107, containing the cubic boron nitride particles of the cubic boron nitride sintered material at a content of more than 65% by volume and 80% by volume or less, (shape: DNGA 150408). The conditions for Cutting Test 5 and Cutting Test 6 correspond to high-efficiency machining of high-hardness steel.

Cutting Test 5: Evaluation of Breakage Resistance

Material to be cut: Round bar of high-hardness steel SCM415H, 5 flutes, HRC62, 100 mm in diameter×300 mm in length Cutting Speed: $V = 150 \, m/min.$ Feed: $f = 0.2 \, mm/rev.$ -continued Depth of cut: $ap = 0.3 \, mm$ Wet/Dry: Dry Cutting method: Intermittent cutting The cutting edge was observed per cutting distance of 0.15 km to measure the amount of the cutting edge dropped. The amount of the cutting edge dropped was defined as the width of the cutting edge recessed due to abrasion from the position of the cutting edge ridgeline before the cutting toward the flank face. In the case of breakage, the size of the cutting edge broken was defined as the amount of the cutting edge dropped. If the amount of the cutting edge dropped exceeded 0.04 mm, or the cutting distance reached 5.0 km, the cutting evaluation was finished, and the amount of the cutting edge dropped was measured. It is meant that as the amount of the cutting edge dropped decreases, the breakage resistance is improved, and the tool life is extended. If the amount of the cutting edge dropped is 0.04 mm or less at a cutting distance of 5.0 km, the sign "A" is described in "Cutting Test 5" in Table 5. If the amount of the cutting edge dropped is more than 0.04 mm at a cutting distance of 5.0 km or less, the sign "B" is described therein. The sign "A" means that the tool is high in breakage resistance, and has a long tool life. The sign "B" means that the tool has insufficient breakage resistance and a short tool life.

Cutting Test 6: Evaluation of Abrasion Resistance

Material to be cut: Round bar of high-hardness steel SCM415H, no flute, HRC62, 100 mm in diameter×300 mm in length Cutting Speed: $V = 120 \, m/min.$ Feed: $f = 0.15 \, mm/rev.$ Depth of cut: $ap = 0.2 \, mm$ Wet/Dry: Wet Cutting method: Continuous cutting The cutting edge was observed per cutting distance of 0.5 km to measure the amount of the cutting edge dropped. The amount of the cutting edge dropped was defined as the width of the cutting edge recessed due to abrasion from the position of the cutting edge ridgeline before the cutting toward the flank face. If the amount of the cutting edge dropped exceeded 0.04 mm, or the cutting distance reached 10.0 km, the cutting evaluation was finished, and the amount of the cutting edge dropped was measured. It is meant that as the amount of the cutting edge dropped decreases, the abrasion resistance is improved, and the tool life is extended. If the amount of the cutting edge dropped is 0.04 mm or less at a cutting distance of 10.0 km, the sign "A" is described in "Cutting Test 6" in Table 5. If the amount of the cutting edge dropped is more than 0.04 mm at a cutting distance of 10.0 km or less, the sign "B" is described therein. The sign "A" means that the tool is high in abrasion resistance, and has a long tool life. The sign "B" means that the tool has insufficient abrasion resistance and a short tool life.

In the present Example, if the results of both Cutting Tests 5 and 6 are "A", it is determined that the tool life is long. If the results of either or both of Cutting Tests 5 and 6 are "B", it is determined that the tool life is insufficient.

TABLE 5

| | Evaluation of tool | |
|---|---|---|
| Sample No. | Cutting Test 5 | Cutting Test 6 |
| 20 | A | A |
| 21 | A | A |
| 22 | A | A |
| 23 | A | A |
| 24 | A | A |
| 25 | A | A |
| 106 | B | A |
| 107 | B | A |

The cubic boron nitride sintered materials and the tools of Samples 20 to 25 correspond to Examples. The cubic boron nitride sintered materials and the tools of Samples 106 and 107 correspond to Comparative Examples. It was confirmed that the tools of Samples 20 to 25 had high breakage resistance and abrasion resistance, and a long tool life. It was confirmed that the tools of Samples 106 and 107 had either of insufficient breakage resistance and insufficient abrasion resistance, and had an insufficient tool life.

<Evaluation of Cubic Boron Nitride Sintered Material>

Samples 6, 11, 22, 26 to 32, 101, 103, and 106 were evaluated as follows.

<<Presence or Absence of First Phase on Interface between Cubic Boron Nitride Particles and Binder Phase>>

It was confirmed whether in each cubic boron nitride sintered material as the sample, the first phase was present on the interface between the cubic boron nitride particles and the binder phase. The specific measuring method is as described in Embodiment 1. The results are shown in the column "Presence or absence of first phase on binder phase interface" of "Cubic boron nitride sintered material" in Table 6. The "Present" means that the first phase is present on the interface between the cubic boron nitride particles and the binder phase. The "Absent" means that the first phase is absent on the interface between the cubic boron nitride particles and the binder phase.

<<Thickness of First Phase>>

In each cubic boron nitride sintered material as the sample, the thickness of the first phase was measured. The specific measuring method is as described in Embodiment 1. The results are shown in the column "Thickness of first phase" of "Cubic boron nitride sintered material" in Table 6.

<<Tungsten Content and Cobalt Content in First Phase>>

Each cubic boron nitride sintered material as the sample was measured for the tungsten content and the cobalt content to confirm which was higher. The results are shown in the column "W content and Co content in first phase" of "Cubic boron nitride sintered material" in Table 6. The formula "W>Co" means that the tungsten content is higher than the cobalt content. The formula "Co>W" means that the cobalt content is higher than the tungsten content.

TABLE 6

| | Cubic boron nitride sintered material | | |
|---|---|---|---|
| Sample No. | Presence or absence of first phase on binder phase interface | Thickness of first phase (nm) | W content and Co content in first phase |
| 6 | Present | 2.4 | W > Co |
| 11 | Present | 1.2 | W > Co |
| 22 | Present | 5.8 | W > Co |
| 26 | Absent | 10.2 | W > Co |
| 27 | Absent | 5.1 | W > Co |

TABLE 6-continued

| | Cubic boron nitride sintered material | | |
|---|---|---|---|
| Sample No. | Presence or absence of first phase on binder phase interface | Thickness of first phase (nm) | W content and Co content in first phase |
| 28 | Absent | 12.1 | W > Co |
| 29 | Absent | 9.6 | W > Co |
| 30 | Absent | 20.6 | W > Co |
| 31 | Absent | 30.1 | W > Co |
| 32 | Absent | 9.8 | Co < W |
| 101 | Absent | 1.1 | W > Co |
| 103 | Absent | 0.5 | W > Co |
| 106 | Absent | 0.5 | W > Co |

<Evaluation of Tool>

<<Cutting Test 5>>

Cutting Test 5 was performed with the tools consisting of the respective cubic boron nitride sintered materials as Samples 6, 103, 27, and 28 (shape: DNGA 150408) under the following conditions.

Material to be cut: Round bar of high-hardness steel SCM415H, 5 flutes, HRC62, 100 mm in diameter×300 mm in length $$\text{Cutting Speed: } V = 150 \, m/\min.$$

$$\text{Feed: } f = 0.15 \, mm/rev.$$

$$\text{Depth of cut: } ap = 0.2 \, mm$$

$$\text{Wet/Dry: Dry}$$

$$\text{Cutting method: Intermittent cutting}$$

The cutting edge was observed per cutting distance of 0.2 km to measure the amount of the cutting edge dropped. The amount of the cutting edge dropped was defined as the width of the cutting edge recessed due to abrasion from the position of the cutting edge ridgeline before the cutting toward the flank face. In the case of breakage, the size of the cutting edge broken was defined as the amount of the cutting edge dropped. If the amount of the cutting edge dropped exceeded 0.03 mm, or the cutting distance reached 2.0 km, the cutting evaluation was finished, and the amount of the cutting edge dropped was measured. It is meant that as the amount of the cutting edge dropped decreases, the breakage resistance is improved, and the tool life is extended. If the amount of the cutting edge dropped is 0.01 mm or less at a cutting distance of 2.0 km, the sign "A" is described in "Cutting Test 5" in Table 7. If the amount of the cutting edge dropped is more than 0.01 mm and 0.02 mm or less, the sign "B" is described. If the amount of the cutting edge dropped is more than 0.02 mm and 0.03 mm or less, the sign "C" is described. If the amount of the cutting edge dropped is more than 0.03 mm at a cutting distance of 2.0 km or less, the sign "D" is described. The sign "A" means that the tool has high breakage resistance and a long tool life.

TABLE 7

| | Evaluation of tool |
|---|---|
| Sample No. | Cutting Test 5 |
| 6 | C |
| 103 | D |

TABLE 7-continued

| Sample No. | Evaluation of tool Cutting Test 5 |
|---|---|
| 27 | A |
| 28 | A |

<<Cutting Test 6>>

Cutting Test 6 was performed with the tools consisting of the respective cubic boron nitride sintered materials as Samples 11, 101, 26, 30, 31, and 32 (shape: DNGA 150408) under the following conditions.

Material to be cut: Round bar of high-hardness steel SCM415H, 5 flutes, HRC62, 100 mm in diameter×300 mm in length Cutting Speed: $V = 150\,m/\min.$ Feed: $f = 0.2\,mm/rev.$ Depth of cut: $ap = 0.3\,mm$ Wet/Dry: Dry Cutting method: Intermittent cutting The evaluation criteria A to D are identical with those of Cutting Test 5. The results are shown in Table 8.

TABLE 8

| Sample No. | Evaluation of tool Cutting Test 6 |
|---|---|
| 11 | C |
| 101 | D |
| 26 | A |
| 30 | B |
| 31 | B |
| 32 | B |

<<Cutting Test 7>>

Cutting Test 7 was performed with the tools consisting of the respective cubic boron nitride sintered materials as Samples 22, 106, and 29 (shape: DNGA 150408) under the following conditions.

Material to be cut: Round bar of high-hardness steel SCM415H, 5 flutes, HRC62, 100 mm in diameter×300 mm in length Cutting Speed: $V = 150\,m/\min.$ Feed: $f = 0.25\,mm/rev.$ Depth of cut: $ap = 0.4\,mm$ Wet/Dry: Dry Cutting method: Intermittent cutting The evaluation criteria A to D are identical with those of Cutting Test 5. The results are shown in Table 9.

TABLE 9

| Sample No. | Evaluation of tool Cutting Test 7 |
|---|---|
| 22 | C |
| 106 | D |
| 29 | A |

As mentioned above, the embodiments and Examples of the present disclosure were described, but it is expected from the beginning that the configurations of the above-mentioned embodiments and Examples are optionally combined or variously modified.

The presently disclosed embodiments and Examples are illustrations in every respect, and should be considered to be unlimited. The scope of the present invention is indicated by CLAIMS rather than by the above-mentioned embodiments and Examples, and it is intended that all the modifications within the meaning and scope equivalent to CLAIMS are included.

The invention claimed is:

1. Cubic boron nitride sintered material, comprising cubic boron nitride particles; a binder phase; and a first phase,
wherein a content of the cubic boron nitride particles in the cubic boron nitride sintered material is 25% by volume or more and 80% by volume or less,
the binder phase comprises either or both of
one or more first compounds consisting of at least one element selected from the group consisting of titanium, zirconium, hafnium, vanadium, niobium, tantalum, chromium, molybdenum, aluminum, and silicon, and at least one element selected from the group consisting of nitrogen, carbon, boron, and oxygen, and
a solid solution derived from the one or more first compounds,
the first phase comprises cobalt, tungsten, and at least one first element selected from the group consisting of titanium, zirconium, hafnium, vanadium, niobium, tantalum, chromium, molybdenum, aluminum, silicon, nitrogen, carbon, boron, and oxygen,
a total content of cobalt and tungsten in the cubic boron nitride sintered material is 1.0% by mass or more and 6.0% by mass or less,
the binder phase consists of multiple binder phase particles, including first binder phase particles, wherein the first binder phase particles constitute 50% or more of the multiple binder phase particles on a number basis,
wherein the first binder phase particles are defined as the multiple binder phase particles for which 50% or more of the surface area of the multiple binder phase particles is in contact with the first phase.

2. The cubic boron nitride sintered material according to claim 1, wherein a portion of the first binder phase particles are also defined as second binder phase particles, wherein the second binder phase particles constitute 50% or more of the multiple binder phase particles on a number basis, and
wherein the second binder phase particles are defined as the multiple binder phase particles for which 75% or more of the surface area of the multiple binder phase particle is in contact with the first phase,
wherein the multiple binder phase particles for which 75% or more of the surface area of the multiple binder phase particle is in contact with the first phase are defined as both a first binder phase particle and a second binder phase particle.

3. The cubic boron nitride sintered material according to claim 1, wherein the binder phase comprises at least one element selected from the group consisting of titanium, chromium, aluminum, carbon, nitrogen, and boron.

4. The cubic boron nitride sintered material according to claim 1, wherein the first element comprises at least one element selected from the group consisting of aluminum, carbon, nitrogen, boron, and silicon.

5. The cubic boron nitride sintered material according to claim 1, wherein the first phase is absent on an interface between the cubic boron nitride particles and the binder phase.

6. The cubic boron nitride sintered material according to claim 1, wherein the first phase has a thickness of 20 nm or less.

7. The cubic boron nitride sintered material according to claim 1, wherein a tungsten content in the first phase is higher than a cobalt content in the first phase.

8. The cubic boron nitride sintered material according to claim 1, wherein a total content of cobalt and tungsten in the cubic boron nitride sintered material is 1.0% by mass or more and 4.5% by mass or less.

9. A tool comprising the cubic boron nitride sintered material according to claim 1.

* * * * *